United States Patent [19]

Bateson

[11] Patent Number: 4,461,219
[45] Date of Patent: Jul. 24, 1984

[54] SINGLE LEVER HATCH COVER

[75] Inventor: Norman E. Bateson, Culver, Ind.

[73] Assignee: Norson Industries, Inc., Culver, Ind.

[21] Appl. No.: 431,685

[22] Filed: Sep. 30, 1982

Related U.S. Application Data

[63] Continuation of Ser. No. 124,798, Feb. 26, 1980, abandoned.

[51] Int. Cl.$^3$ .................... B60D 17/12; B61D 39/00; B65D 45/08
[52] U.S. Cl. .................................. 105/377; 16/47; 52/45; 220/314; 292/175
[58] Field of Search .............. 105/377; 16/47; 52/45; 220/57, 314; 292/175

[56] References Cited

U.S. PATENT DOCUMENTS 2,837,040 6/1978 Johansson .......................... 105/377
4,248,160 2/1981 Carney et al. ..................... 105/377

Primary Examiner—Richard A. Bertsch
Attorney, Agent, or Firm—John R. Nesbitt

[57] ABSTRACT

A hatch cover opening and closing assembly which includes a hat member rockably secured to the hatch at about its center, the hatch cover being pivotably secured to the railway car coaming through the hat member at one end and the other end of the hat member being adapted to coact with a locking assembly that locks the hatch in closed, sealed, position either by means of a cam or crank acting mechanism.

10 Claims, 13 Drawing Figures

SINGLE LEVER HATCH COVER

This application is a continuation of application Ser. No. 124,798, filed Feb. 26, 1980 which has been abandoned.

BACKGROUND OF THE INVENTION

For many uses of railroad hopper cars it is desirable to pressurize the car so that, for example, dust and dirt in the air are unable to get inside the car and contaminate the contents, such as plastic pellets covered with a layer of inert gas. Hatch covers for pressurized cars typically have a nominal diameter (measured by the I.D. of the "coaming" or hatch) of 20 inches. Using a cover of that size, under pressure, results in problems in the attempt to effectively seal the hatch.

Conventionally, the covers have been cast aluminum or cast stainless steel for rigidity and cleanliness, held down by three or more threaded hand wheels. The use of three or more hand wheels is an attempt to eliminate the problem of uneven sealing pressure (a good seal adjacent the hand wheels and a poor seal between the wheels). To improve the sealing capability, the covers were made thicker and more rigid, thus increasing their material cost. In an effort to reduce the excessive material cost and weight of the cover, some prior art hatch covers were made from fiber reinforced plastic (FRP), but it was found not to be economically feasible to make FRP covers which would be rigid enough to prevent leakage from the hatch. By necessity, therefore, railroad car manufacturers have continued to make the hatch covers from aluminum or stainless steel and the continued use of the hand wheel sealing apparatus involves additional problems, of the type normally anticipated where it is necessary to constantly run a threaded member into and out of another member having internal threads. Not only do the threaded portions corrode, jam and cross-thread, but also a considerable amount of time, skill and care are required to run-down the series of threaded hand wheels so that the seal pressure is as uniform as is possible with such a cover and lock arrangement, while not damaging the gasket. It is most advisable to tighten the wheels alternately and in stages as is done with the lug-nuts for an automobile wheel.

The concern over the prevention of dirt getting to the contents of the hopper car is well illustrated by the procedure followed when the contents are unloaded. Before the underside of the car is opened to permit removal of the contents, filters are placed over the tops of the hatches to prevent dirt from being sucked in by the partial vacuum created as the material is dumped from the bottom of the hopper. Therefore, it can readily be appreciated that the ability to lock and unlock the hatch cover quickly is of importance to the railroads, shippers and receivers.

In U.S. Pat. No. 3,821,935, granted July 2, 1974, invented by Franklin P. Adler and assigned to Pullman Transport Leasing Company, a hatch cover is provided with a handwheel having a threaded shaft extending through the hatch cover. A hub is threaded onto the shaft having a plurality of radially extending locking arms which engage fixed lugs on the hatch coaming. A guide plate depending from the cover includes a cam slot which receives a follower extending from the hub. Rotation of the handwheel causes rotation and vertical movement of the locking arms into engagement with a lip on the coaming. To open the cover the handwheel is rotated in the opposite direction until the locking arms clear the locking lugs. The cover is then pivoted about a hinge to the open position.

This construction is disadvantageous because of the difficulty of obtaining a satisfactory seal between the threaded shaft and the cover and the large number of turns of the handwheel required to move the locking arms between open and closed position and because of cost. Furthermore, the internal friction between the threaded shaft and hub may result in some contamination by lubricant and/or ground metal. Also the screw is inside where it can (and does) contaminate the load with corrosion and lubricant.

Also the force urging the seal into engagement with the coaming is dependent upon the number of turns applied by the operator. If an insufficient number of turns is applied by the operator, the cover may not remain properly seated in transit.

An improved version of the hatch cover disclosed in U.S. Pat. No. 3,821,935 is disclosed in U.S. Pat. No. 4,073,239 invented by Franklin P. Adler and assigned to Apex Railway Products Co., however, many of the same problems with the cover described in U.S. Pat. No. 3,821,935 remain.

Another approach to the hatch cover construction is shown in U.S. Pat. No. 4,132,327 invented by Ronald D. Van Dyke, et al., and assigned to ACF Industries, Inc. While this construction eliminates some of the problems with the cover described in the aforesaid patents, the same problems respecting center bolt leakage and corrosion remain and the leaf spring retainer substituted for the massive (and expensive) spider of U.S. Pat. No. 3,821,935 is not rugged enough for long term use.

SUMMARY OF THE INVENTION

In accordance with the present invention a hatch cover opening and closing assembly is provided which includes a hat section which is flexibly secured to the hatch cover so that pressure is applied evenly around the perimeter and is pivotally mounted at one end by downwardly extending brackets to the vertically upstanding brackets commonly mounted on the top of covered hopper railway cars adjacent the hatch openings. The other end of the hat section includes a slot sized and positioned to receive either a crank acting locking handle or a cam acting locking handle.

The crank locking is such that in the closed position the hinge pin of the link goes over the center of the hinge pin of the handle thus the vibrations in transit only tighten the lock and do not tend to open.

The developed cam shape is such that the initial opening movement of the handle compresses the seal further before opening to accomplish the same positive locking.

A laterally extending bracket is provided on the exterior portion of the hatch coaming to which is pivotally connected either the crank acting locking handle assembly (which is the preferred embodiment) or the cam acting locking handle assembly.

One object of this invention is to provide a hatch locking assembly which obtains a proper seal (watertight) between the hatch cover and the coaming of a railway car while eliminating the time consuming locking operation required by prior art devices.

Another object of this invention is to provide a hatch locking assembly which eliminates the center bolt construction of existing devices and thereby eliminate load contamination problems encountered with such prior art devices.

Still another object of the present invention is to provide a hatch locking assembly that accomplishes all the above objectives while at the same time also permitting the use of a lighter weight hatch than is presently in use with said prior art devices.

THE DRAWINGS

FIG. 1 has four subdrawings, being FIGS. 1A, 1B, 1C, and 1D which illustrate the various positions of operation of the present hatch locking assembly;

Figure 7:
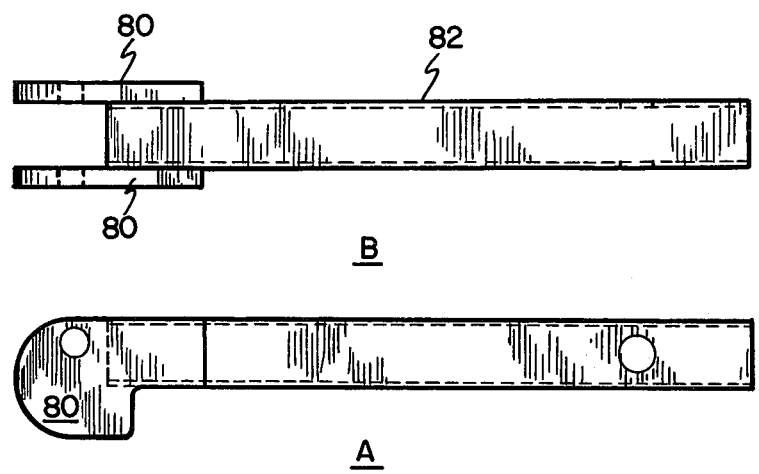

FIG. 7 includes FIGS. 7A and 7B, being a side view and a top view, respectively, of a handle with cam portions attached.

Figure 8:
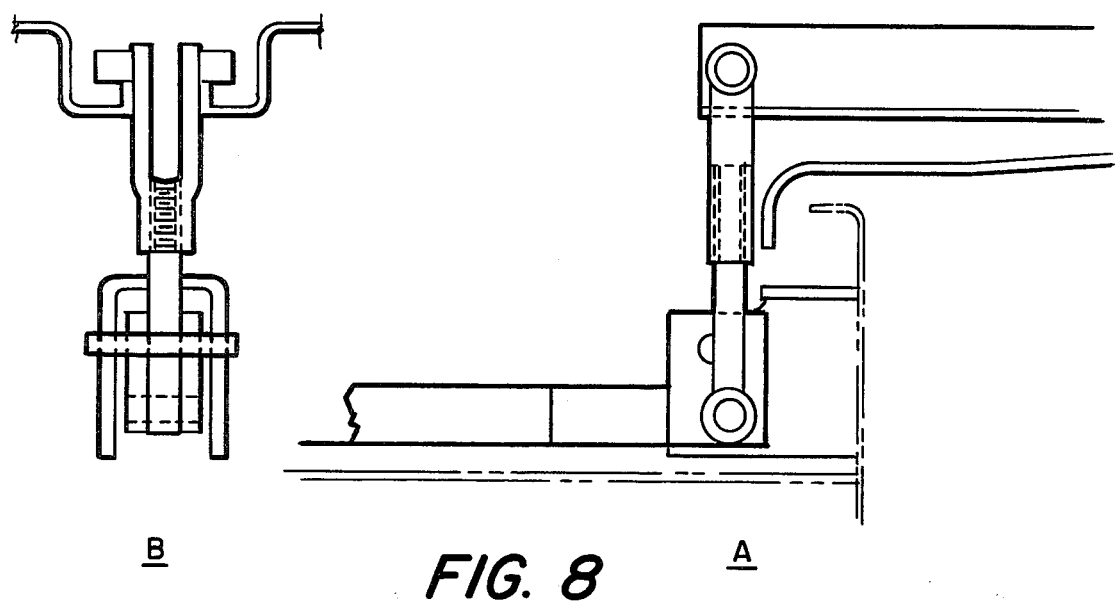

FIG. 8 includes FIGS. 8A and FIG. 8B, being, respectively, a side view of another embodiment of the present invention, and an end view of the device shown in FIG. 8A.

DESCRIPTION OF THE PREFERRED EMBODIMENT

Figure 1:
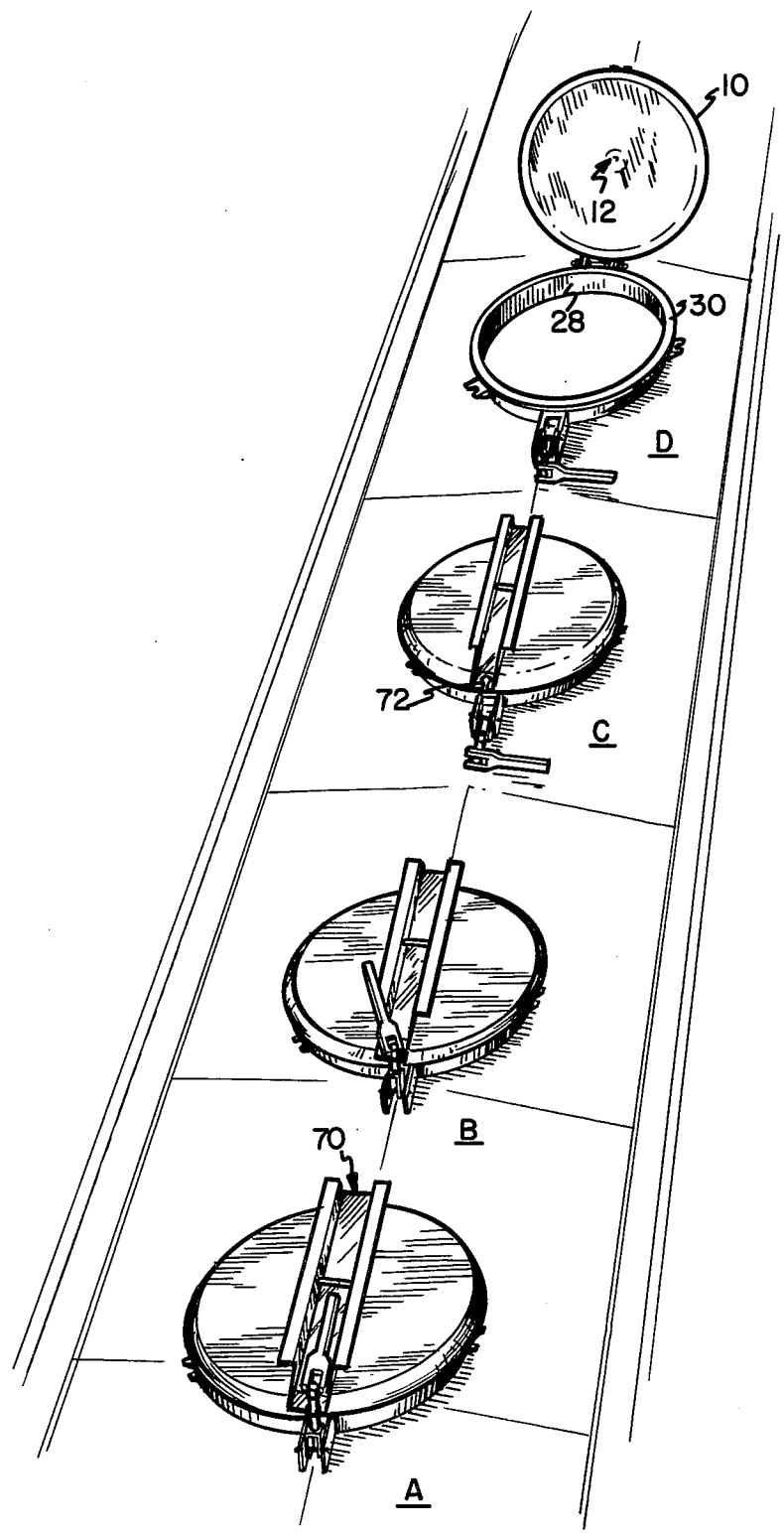

FIG. 1 shows one embodiment of the invention in the fully closed position (FIG. 1A), with the locking handle in a released and partially rotated position (FIG. 1B), in a fully released position with the locking handle laying on the top of the car (FIG. 1C) and in an open position (FIG. 1D).

The Crank Locking Assembly

Figure 2:
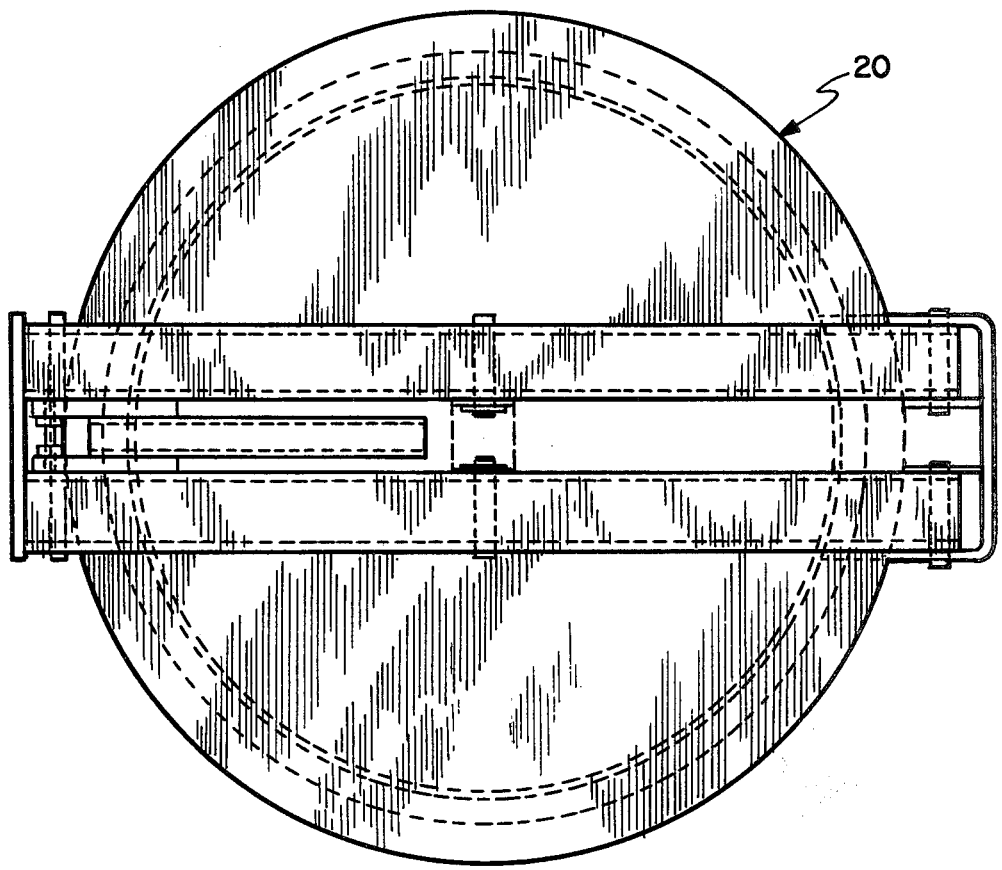
FIG. 2 is a top view of one embodiment of the hatch and hatch locking assembly.
Figure 3:
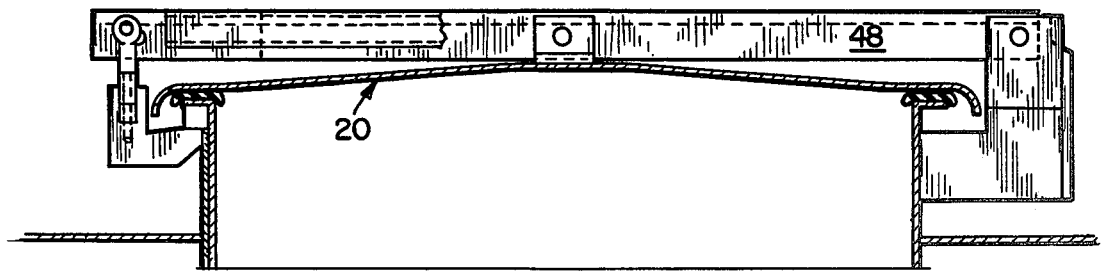
FIG. 3 is a side view of the locking assembly and hatch shown in FIG. 2.
Figure 4:
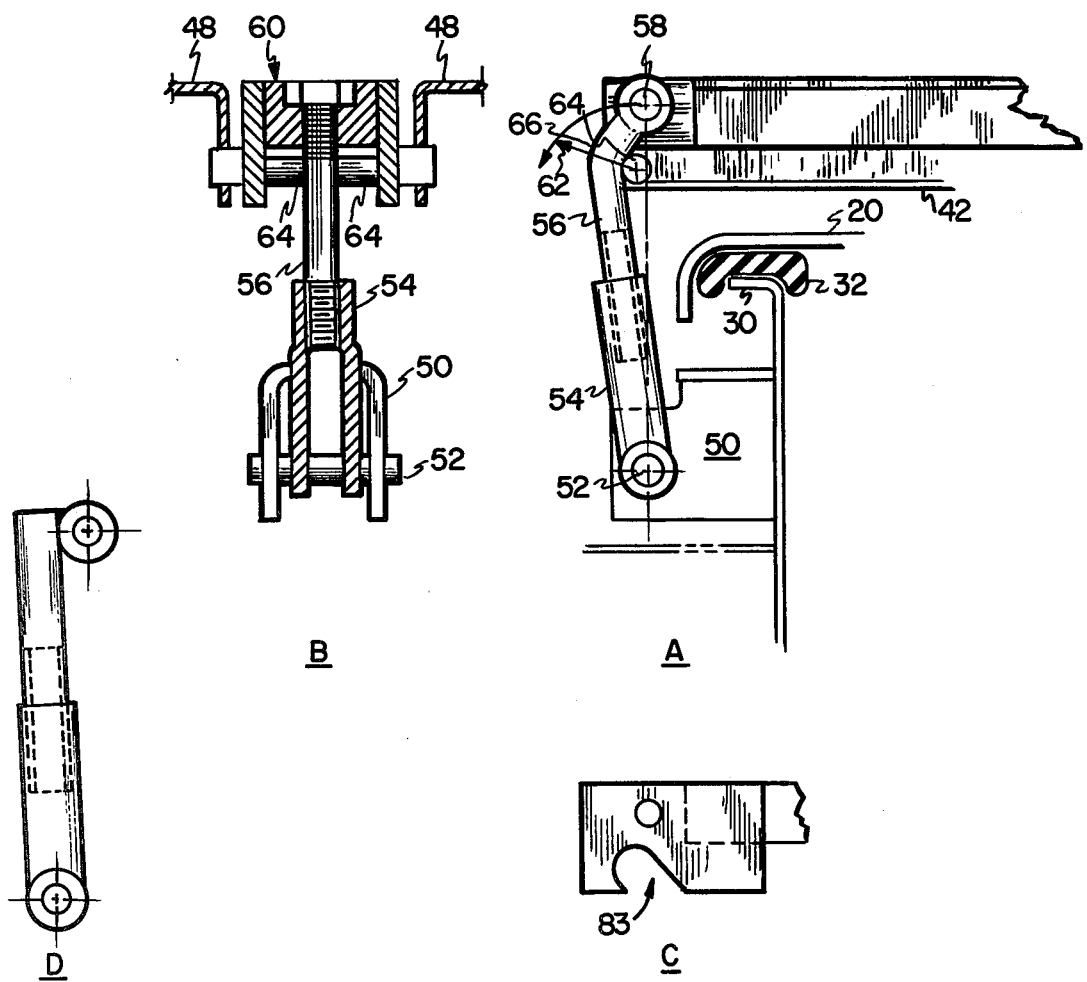
FIG. 4 is a composite drawing, including FIG. 4A, FIG. 4B, and FIG. 4C, of the preferred embodiment of the present invention.

The crank locking assembly is the preferred embodiment (shown in FIG. 4) and is used in conjunction either with a standard Pullman round hatch 10 as shown in FIG. 1 (note the plugged center bolt hole 12 in FIG. 1) or with the Norson round hatch 20 as shown in FIGS. 2 and 3. The Norson hatch is upwardly dished and will sustain the compressive load of sealing as well as a man standing upon it (and is 3/16 inches thick as opposed to the standard Pullman 5/16 inches thick). The present locking assembly will work with either hatch, but the center bolt hole 12 of the Pullman hatch is not utilized by the locking assembly described by this invention and so a cheaper and less massive hatch can be conveniently used in conjunction with the present invention.

Figure 6:
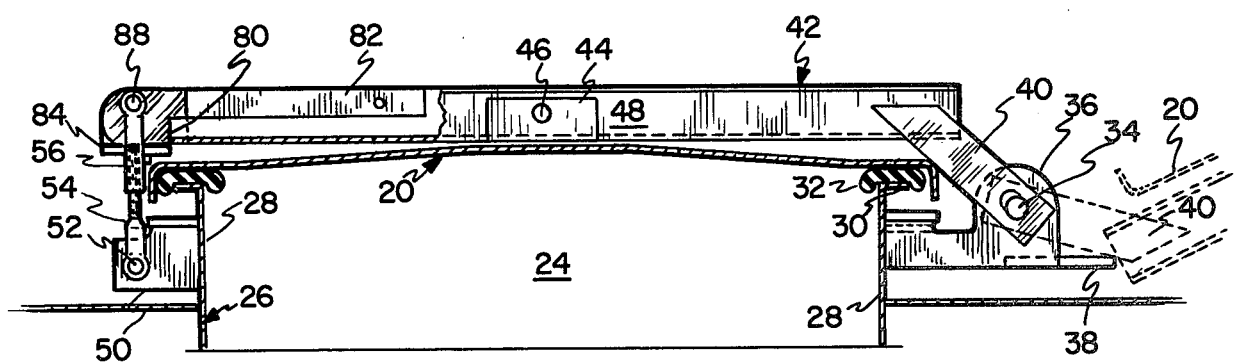
FIG. 6 is a side view of the view taken in FIG. 5.

FIG. 6 shows the way in which the hatch cover 20 and lock assembly are utilized to seal the hatch of a pressurized hopper car. The hatch opening 24 is defined by the coaming 26 which includes a vertical cylindrical wall 28 terminating at its top in an outwardly turned flange 30. When the hatch locking assembly is actuated into the hatch sealing position (shown in FIG. 4) the hatch cover 20 is forced downwardly against annular elastomeric gasket 32 whereby a seal is effected between the hatch cover 20, gasket 32, and the coaming top flange 30. Hat piece 42 is attached to the hatch cover 20 by brackets 44 which are fixed to the cover, and a loose fitting pin 46 extends through downturned flanges 48. Hat piece 42 is connected to bracket 36 by a hinge 40 which is hinged on pin 34. Pin 34 is secured (as by welding) to bracket 36 which is fixed to the vertical wall 28 of the coaming. A stop 38 is secured to bracket 36 to stop hinge 40 so that the cover cannot slam on the car roof in its open position (as shown in phantom lines in FIG. 6).

The hinge 40 is slotted for hinge pin 34 so that the cover can rest open in two different angular positions against the stop 38 depending on the overhead clearance at the loading site.

The hatch locking assembly is connected to the coaming by hold down bracket 50 to which is attached a clevis yoke 54 by means of hinge pin 52. Clevis eye 56 is screwed into clevis yoke 54 so that a quick adjustment may be made so that hatch cover 20 can be tightly closed. The adjustment is necessary so that the hatch cover and locking assembly here proposed can be universally used with coamings and mounting brackets 50 and 36 that may vary due to manufacturing variations. The yoke and clevis may be of one piece construction, however, and still be within the teaching of this invention, and this could be done, as a practical matter, if the coaming 26, and the hatch and locking assembly were made as a single unit. Then the adjustment provided by the clevis and yoke described would not be needed.

Attached to yoke 56 by hinge pin 58 is actuator or handle 60. The hatch is released by lifting handle 60 which creates a rotational force moment 62 about pin 64 which causes eye 56 to "crank" counter-clockwise (as shown in FIG. 4A) which releases the engagement of the bent portion 66 of the eye with pin 64 whereby lifting the handle about 180° (as shown in FIG. 1B) permits rotation of the handle out of its protected position in the interior section of the hat piece 42 so that eye 56 then is free to be retracted from slot 72 in the hat piece and the whole lock assembly is laid on the top of the car (as shown in FIG. 1C). The bend 66 in eye 56 is so proportioned that pivot pin 58 passes over center of pin 66 to ensure lock remains closed in transit.

Figure 5:
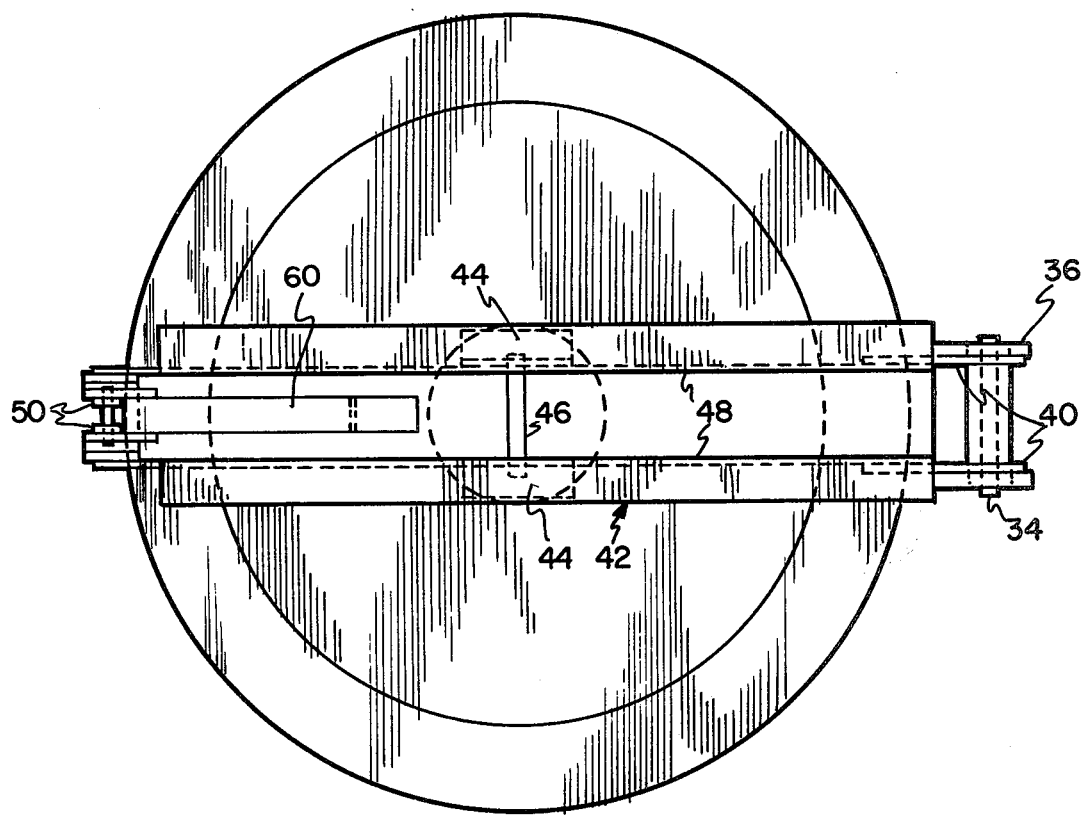
FIG. 5 is a top view of a hatch and cam embodiment of the present invention.

The operation of the locking assembly shown in FIGS. 5, 6 and 7 is similar to the "crank" configuration described above, but cam inserts 80 are welded to the sides of the handle 82. In operation of this cam embodiment, a cam bracket 84 is fixed to hat piece 42 and cams 80 bear on this bracket. When handle 82 is rotated about 180° the camming action occurs between cams 80 and cam bracket 84 and pin 88 is moved so that the locking force exerted through the hat piece on the hatch cover (when the handle is in closed position) is released.

The embodiments in FIGS. 2 and 3, and in FIG. 8, function in a manner similar to those described above as respects force transmittal. The main differences being the details of the modes in which the crank (or camming) actions are accomplished.

The cam shape is such that in opening the initial movement compresses the seal further before releasing the pressure, thus ensuring the lock remains closed in transit.

Other obvious modifications of the constructions proposed will be obvious to those skilled in the art and this invention is to be limited only by the scope of the appended claims.

What is claimed is:

1. A hatch cover assembly for closing and opening a hatch on a vehicle having a hatch with a coaming therearound, said assembly comprising:

a hatch cover compression member having a distal end and an opposite end, said compression member being pivotally mounted at its said opposite end on said vehicle;

a hatch cover pivotally mounted inwardly of its periphery on said compression member intermediate the ends of the latter and being free at its periphery to move both around and laterally of its pivot point on said compression member;

a sealing gasket intermediate said cover and said coaming for providing a seal between said cover and said coaming; and locking means pivotally mounted relative to and adjacent said distal end of said compression member, said locking means being pivotable to a first position in which it applies pressure to said distal end of said compression member and thereby applies pressure to said central portion of said cover to urge said cover toward said coaming at all peripheral portions thereof and being pivotable to a second position in which it releases said distal end of said compression member and permits said compression member to pivot and thereby, permits movement of said cover away from said hatch.

2. A hatch cover assembly as set forth in claim 1 wherein said locking means comprises cam means acting between said distal end of said compression member and said coaming for urging said distal end of said compression member toward said coaming.

3. A hatch cover assembly as set forth in claim 2 wherein said cam means comprises a link pivotally secured at one end to said coaming, and actuator pivotally secured to the other end of said link and having a cam surface engageable with said distal end of said compression member whereby said cam surface in a locking position of said actuator urges said distal end of said actuator and said cover toward said coaming and whereby in a second, release position of said actuator, said cam surface and said actuator are movable away from distal end of said compression member with pivotal movement of said link to permit pivotal movement of said compression member and said cover away from said coaming.

4. A hatch cover assembly as set forth in claim 3 wherein said link is adjustable in length between its connection to said actuator and its connection to said coaming.

5. A hatch cover assembly as set forth in claim 1 wherein said locking means comprises an actuator, a link pivotally secured at one end to said vehicle, said link being bent at its other end thereof and being pivotally connected at said other end to said actuator, said distal end of said compression member has a pin secured thereto and said actuator pivotally and releasably engages said pin whereby in the locking position of said actuator, the pivot point of said other end of said link is nearer said opposite end of said compression member than the center of said pin to provide an over-center, actuator locking action.

6. A hatch cover assembly as set forth in claim 2 wherein said cam means comprises a projecting member on said coaming, a link pivotally connected at one end to said compression member and an actuator pivotally connected to the opposite end of said link, said actuator having a surface engageable with said projecting member upon pivotal movement thereof.

7. A hatch cover assembly as set forth in claim 1 wherein said compression member is elastic and is resiliently bendable within its elastic limit so that said compression member provides the pressure on said cover required to provide the desired sealing pressure with variations in the height of said coaming.

8. A hatch cover assembly as set forth in claim 1 wherein said cover is pivotally connected at its center to said compression member at about midway between said distal end and said opposite end thereof by pivot means which has a pivot axis extending generally parallel to a plane containing said periphery of said cover and extending generally perpendicular to the length of said compression member between said distal end and said opposite end thereof, whereby said cover may be pivoted in the direction around said pivot axis, said pivot means also permitting said cover to tilt in a direction substantially perpendicular to said pivot axis whereby said cover may adjust in position as pressure is applied thereto by said compression member so as to apply equal pressure around its periphery to said sealing gasket.

9. A hatch cover opening and closing assembly according to claim 1 in which the compression member is pivoted about a member secured to said coaming, which latter member includes stop means to prevent said cover from impacting upon the top of the railway car when in fully opened position.

10. The hatch cover opening and closing assembly according to claim 9, in which said member secured to the said coaming includes means to hold said cover in partially opened position without said cover being opened to its fully open position.

* * * * *